United States Patent
Okuhara et al.

(10) Patent No.: US 8,487,188 B2
(45) Date of Patent: Jul. 16, 2013

(54) GROMMET

(75) Inventors: Takashi Okuhara, Yokkaichi (JP);
Tsutomu Sakata, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 337 days.

(21) Appl. No.: 12/865,170

(22) PCT Filed: Feb. 1, 2008

(86) PCT No.: PCT/JP2008/051640
§ 371 (c)(1),
(2), (4) Date: Oct. 7, 2010

(87) PCT Pub. No.: WO2009/096036
PCT Pub. Date: Aug. 6, 2009

(65) Prior Publication Data
US 2011/0011625 A1 Jan. 20, 2011

(51) Int. Cl.
*H01B 17/26* (2006.01)
*H01B 17/58* (2006.01)
*H02G 3/22* (2006.01)
*F16L 5/00* (2006.01)

(52) U.S. Cl.
USPC .......................................... 174/152 G; 16/2.1

(58) Field of Classification Search
USPC ................ 174/152 G, 153 G, 650, 152 GM, 174/154; 16/2.2, 2.1, 2.5; 277/602, 608, 636
See application file for complete search history.

(56) References Cited

U.S. PATENT DOCUMENTS

| | | | |
|---|---|---|---|
| 5,526,549 A | 6/1996 | Mori et al. | |
| 6,339,196 B1 | 1/2002 | Uchida | |
| 6,353,185 B1 | 3/2002 | Sakata | |
| 6,442,794 B2 | 9/2002 | Uchida et al. | |
| 6,465,740 B2 | 10/2002 | Kondoh et al. | |
| 6,495,767 B2 | 12/2002 | Okuhara et al. | |
| 6,541,703 B2 | 4/2003 | Nakata | |
| 6,603,078 B2 | 8/2003 | Okuhara et al. | |
| 6,685,195 B2 | 2/2004 | Uchida et al. | |
| 6,825,416 B2 * | 11/2004 | Okuhara | 174/152 G |
| 6,897,380 B2 | 5/2005 | Uchida | |
| 7,098,402 B2 * | 8/2006 | Suzuki | 174/153 G |
| 2002/0036097 A1 | 3/2002 | Okuhara et al. | |

(Continued)

FOREIGN PATENT DOCUMENTS

| | | |
|---|---|---|
| JP | 11-7855 | 1/1999 |
| JP | 2002-171644 | 6/2002 |
| JP | 2004-320951 | 11/2004 |
| JP | 2006-123572 | 5/2006 |

*Primary Examiner* — Timothy Thompson
*Assistant Examiner* — Roshn Varghese
(74) *Attorney, Agent, or Firm* — Greenblum & Bernstein, P.L.C.

(57) ABSTRACT

A grommet includes a small diameter tubular section and a large diameter tubular section contiguous with the small diameter tubular section. The large diameter tubular section is provided on the outer peripheral surface with a plurality of projecting portions that extend from a connecting part between both of the sections to a side wall of vehicle body engagement annular recess in an axial direction of the large diameter tubular section and are separated from one another in a peripheral direction of the large diameter tubular section. Each of the projecting portions includes an increasing diameter directing slant portion that extends from the proximal end point through the contact point to the bending point in parallel to the outer peripheral surface of the large diameter tubular section, and a decreasing diameter directing slant portion that extends from the bending point to the distal end point and inclines in a reversed slant direction.

18 Claims, 6 Drawing Sheets

U.S. PATENT DOCUMENTS

2002/0036098 A1 3/2002 Okuhara et al.
2003/0062694 A1* 4/2003 Uchida et al. .................. 16/2.1
2004/0206538 A1 10/2004 Okuhara
2006/0086524 A1 4/2006 Suzuki

* cited by examiner

GROMMET

FIELD OF THE INVENTION

This invention relates to a grommet, and more particularly relates to a grommet that is attached to a wire harness for a motor vehicle and is installed in a through-hole in a vehicle body panel to protect, waterproof, and dustproof the wire harness.

BACKGROUND OF THE INVENTION

Heretofore, a grommet is attached to a wire harness to be arranged from an engine room in a motor vehicle to a passenger room. The grommet is installed in a through-hole in a vehicle body panel that partitions a vehicle body into an engine room and a passenger room to protect the wire harness passing the through-hole and to waterproof, dustproof, sound-insulate the passenger room from the engine room.

The present applicant has provided a so-called one-motion grommet in which a vehicle body engagement annular recess provided on an outer periphery of the grommet is engaged with a peripheral edge around the through-hole in the vehicle body panel merely by pushing the grommet into the through-hole from one side.

Figure 7:
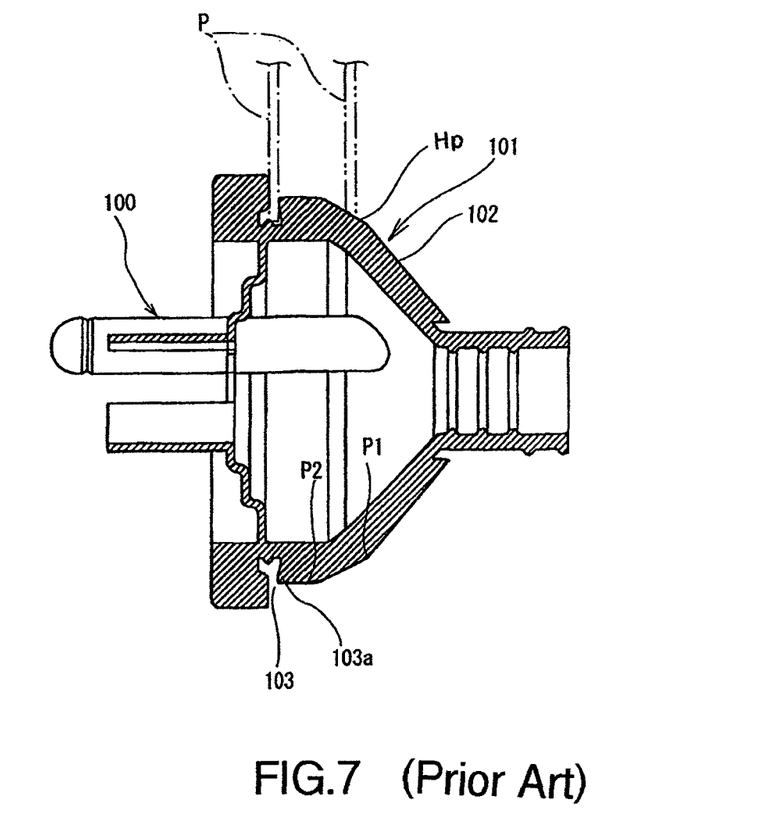
FIG. 7 is a longitudinal section view of a prior art grommet.

The one-motion grommet has been disclosed in JP 2002-171644 A. As shown in FIG. 7, a large diameter tubular section 101 of a grommet 100 is provided on an outer peripheral surface with projecting portions 102 so that a contact area between the large diameter tubular section and an inner peripheral surface around a through-hole Hp in a vehicle body panel P is decreased in order to reduce a force for inserting the grommet 100 into the through-hole Hp.

Further, each of the projecting portions 102 changes a slant angle at point P1 that contacts the inner peripheral surface around the through-hole Hp so as to decrease a projecting amount of the projecting portion, and further changes a slant angle at a point P2 that is the same height as a side wall 103a of a vehicle body engagement annular recess 103 so as to be in parallel to an axial direction of the large diameter tubular section 101, namely to be a horizontal direction in FIG. 7.

The inserting force can be reduced by gradually decreasing the projecting amount of the projecting portion 102 toward the vehicle body engagement annular recess 103.

Patent Document 1: JP 2002-171644 A

SUMMARY OF THE INVENTION

Problems to be Solved by the Invention

As described above, if the slant angles of the projecting portions are changed at two positions in the longitudinal direction so that the projecting amounts of the projecting portions are decreased gradually, and if the distal ends of the projecting portions continued to the side wall 103a of the vehicle body engagement annular recess 103 extend in a horizontal direction parallel to the axial direction, there will be problems that the crisp feel is not caused upon inserting the grommet into the through-hole, that the last time for strongly pushing the grommet cannot be recognize, and that inserting feel is lowered.

In particular, it is necessary to carefully push the grommet 100 straightly into the through-hole Hp so that a central axis of the grommet 100 accords with a central axis of the through-hole Hp when the last pushing force is applied to the grommet 100. However, if the crisp feel is not caused at the position where the last pushing force is applied, the grommet 100 is likely to be pushed into the through-hole Hp while the grommet is inclined. When the grommet 100 is inserted slant into the through-hole Hp, one side of the large diameter tubular section 101 is pressed extremely, the outer peripheral surface of the thin large diameter tubular section 101 that extends to the side wall 103 of the vehicle body engagement annular recess 103 is deformed inward, and the side wall 103a of the vehicle body engagement annular recess 103 to be essentially deformed inward is likely to be deformed outward in a reversed direction. Consequently, there will be a problem that the side wall 103a interferes with the vehicle body panel P, so that the grommet 100 cannot be inserted into the through-hole Hp.

The horizontal portions at the distal end sides of the projecting portions 102 cannot maintain their horizontal states on account of the inner peripheral surface around the through-hole of pushing the horizontal portions, the horizontal portions are likely to be inclined inward, and an inner peripheral surface around the through-hole Hp falls into the vehicle body engagement annular recess 103. This makes it difficult to find the time of installing the grommet in the through-hole Hp. Consequently, there is a problem that the inserting feel will be lowered.

In view of the above problems, an object of the present invention is to provide an one-motion grommet in which a crisp feel can be caused when the grommet is inserted into a through-hole in a vehicle body panel, an axial direction of the grommet accords with an axial direction of the through-hole upon the final pushing operation so that a strong inserting force can be exerted, thereby improving an inserting feel and correcting an inserting posture of the grommet in a straight direction.

Means for Solving the Problems

In order to achieve the above object, a grommet in accordance with the present invention includes a small diameter tubular section and a large diameter tubular section contiguous with the small diameter tubular section. Both of the sections are attached to a wire harness for a motor vehicle by threading the wire harness through both of the sections. The small diameter tubular section is inserted into a through-hole in a vehicle body panel. The large diameter tubular section is provided on an outer peripheral surface with a vehicle body engagement annular recess. The recess is adapted to be engaged with the vehicle body panel. The large diameter tubular section is provided on the outer peripheral surface with a plurality of projecting portions that extend from a connecting part between both of the sections to a side wall of the vehicle body engagement annular recess in an axial direction of the large diameter tubular section and are separated apart from one another in a peripheral direction of the large diameter tubular section. Each of the projecting portions includes a contact point P1 that initially contacts with an inner peripheral surface around the through-hole upon inserting the grommet into the hole, a bending point P2 above the contact point P1, a distal end point P3 at a side of the vehicle body engagement annular recess, and a proximal end point P4 at the connecting part. Each of the projecting portions includes an increasing diameter directing slant portion that extends from the proximal end point P4 through the contact point P1 to the bending point P2 in parallel to the outer peripheral surface of the large diameter tubular section, and a reducing diameter directing slant portion that extends from the bending point P2 to the distal end point P3 and inclines in a reversed slant direction.

As described above, in the grommet of the present invention, each of the projecting portions of the grommet is provided at the position for requiring for the last pushing force over the contact point P1 between each of the projecting portions and the through-hole in the vehicle body panel with the bending point P2 that has a hill-like shape by reversing the slant direction. When the inner peripheral surface around the through-hole contacts with the bending point P2 on each of the projecting portions, the grommet is caught by the inner peripheral surface around the through-hole. When the bending point P2 passes over the inner peripheral surface, the crisp feel is caused. It is possible for a working person to strongly push the grommet into the through-hole at a stroke when the crisp feel is caused. This will make it good feel to carry out a work for inserting the grommet into the through-hole. At this time, it is possible for the working person to check whether or not the axis of the grommet accords with the axis of the through-hole and it is also possible for the working person to prevent the grommet from being slant inserted into the through-hole.

The grommet of the present invention is made of an elastic material such as rubber or elastomer, as is the same with a conventional grommet. As described above, since the large diameter tubular section of the grommet is provided on the outer peripheral surface with the projecting portions that extend in the axial direction, only the parts of the projecting portions contact the inner peripheral surface around the through-hole if the grommet is slant inserted into the through-hole. Consequently, the working person can find that the grommet is slant inserted into the through-hole and can correct the inserting direction of the grommet to the straight posture. Further, since the crisp feel is caused at the bending point P2, it is possible for the working person to confirm whether or not the grommet is inserted into the through-hole in the straight posture.

The vehicle body engagement annular recess includes: a side wall that comprises a vertical wall at a large diameter end side of the large diameter tubular section and a slant wall opposed to the vertical wall at a small diameter end side; and a bottom wall between the vertical and slant walls. The grommet passes the through-hole while inward deforming the slant wall of the side wall at the small diameter tubular section side. As described above, the large diameter tubular section is provide on the outer peripheral surface with the projecting portions that extend from the connecting part between both of the sections to the projecting distal end of the slant wall of the vehicle body engagement annular recess in a radial arrangement.

Thus, the projecting portions provided on the outer peripheral surface of the large diameter tubular section can reinforce the section and can reduce a contact area between the section and the inner peripheral surface around the through-hole and the inserting force.

Preferably, the bending point P2 is disposed at a position where a distance L1 from the contact point P1 to the bending point P2 is substantially equal to a distance L2 from the bending point P2 to the distal end point P3. That is, the bending point P2 is disposed at a position of a half distance from the contact point P1, which contacts with the inner peripheral surface around the through-hole, to the distal end point P3 where the peripheral edge around the through-hole is fitted in the vehicle body engagement annular recess. The bending point P2 causes the crisp feel, thereby enhancing an inserting force.

Preferably, an angle between the increasing diameter directing slant portion and the reducing diameter directing slant portion at the bending point P2 is set to be in a range from 100 degrees to 120 degrees.

If the angle is less than 100 degrees, when the inner peripheral surface around the through-hole presses the bending point P2, the reducing diameter directing slant portion from the bending point P2 to the distal end point P3 does not extend in a horizontal direction parallel to the axial direction but is likely to be deflected inward. On the other hand, if the angel is more than 120 degrees, the portion from the bending point P2 to the distal end point P3 is likely to be deflected outward. It is more preferable that the angle is set to be in the range from 100 degrees to 110 degrees.

That is, when the increasing diameter directing slant portion is pressed at a position immediately before the bending point P2 by the inner peripheral surface around the through-hole, the reducing diameter directing slant portion is deflected outward, thereby surely causing the crisp feel. On the other hand, when the increasing diameter directing slant portion is pressed at the bending point P2 by the inner peripheral surface around the through-hole, the reducing diameter directing slant portion from the bending point P2 to the distal end point P3 extends substantially in parallel to a central axis of the large diameter tubular section, thereby facilitating to insert the grommet into the through-hole.

The grommet according to the present invention is made of rubber or elastomer, and a crest angle at the bending point P2 is formed into a minimum radius in a formable range, thereby forming the crest into an edge-like shape as sharp as possible.

Thus, the inner peripheral surface around the through-hole is readily caught by the bending point P2 by forming the bending point P2 into the edge-like shape, thereby giving a distinct crisp feel to a working person.

An outer surface of each projecting portion may be provided on opposite end edges in the peripheral direction with taper. It is preferable that each projecting portion is provided on bases of opposite side surfaces in a width direction with grooves so that the projecting portion can be deflected inward when it is inserted into the through-hole.

Further, it is preferable that each triangular concaved portion between the adjacent projecting portions in the peripheral direction is provided on a central part with a longitudinal groove so that the triangular concaved portion can be readily deformed inward upon inserting the grommet into the through-hole.

Effects of the Invention

As described above, in the grommet of the present invention, the large diameter tubular section is provided on the outer peripheral surface with the projecting portions that extend in the axial direction and are separated apart from one another, the projecting portions serve to reduce the contact resistance so as to decrease the inserting force and to reinforce the thin large diameter tubular section. Each of the projecting portions is provided with the mount-like bending point P2 that reverses the slant direction at the position where the working person can push the grommet into the through-hole at a stroke. Consequently, the grommet will causes interference with the through-hole when the projecting portions pass on the bending point P2, thereby causing the crisp feel. Thus, since the grommet of the present invention can positively exert the crisp feel, it is possible for the working person to push the grommet into the through-hole at a stroke at the position that causes the crisp feel, and to carry out the work of inserting the grommet into the through-hole with good feel.

EXPLANATION OF SIGNS

10: grommet
11: first small diameter tubular section
13: large diameter tubular section
    13a: outer peripheral surface
14: vehicle body engagement annular recess
    14c: slant wall
20: projecting portions
    20A: increasing diameter directing slant portion
    20B: reducing diameter directing slant portion
21: concaved portions
30: vehicle body panel
P2: bending point
Hp: through-hole
Hb: burring

DETAILED DESCRIPTION OF THE INVENTION

Referring now to FIGS. 1 to 6, an embodiment of a grommet in accordance with the present invention will be described below.

Figure 2:
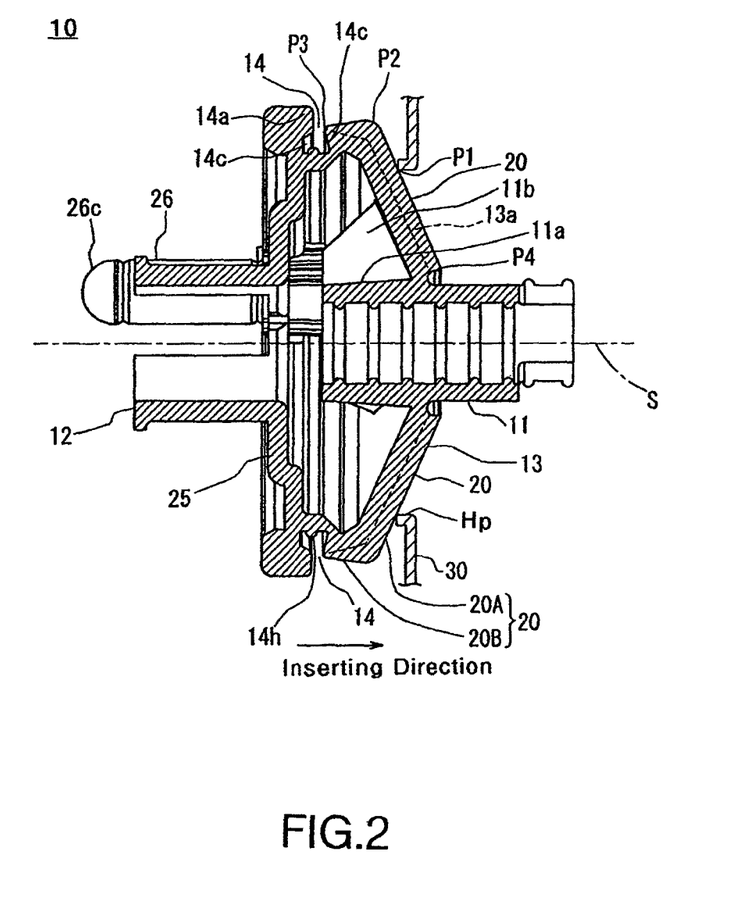
FIG. 2 is a longitudinal section view of the grommet taken along lines A-A in FIG. 1.

A grommet 10 is integrally made of rubber. As shown in FIG. 2, the grommet 10 includes a first small diameter tubular section 11 at a front side to be inserted into a through-hole Hp in a vehicle body panel 30, a second small diameter tubular section 12 at a rear side opposite from the front side, and a large diameter tubular section 13 between the first and second small diameter tubular sections 11 and 12.

The large diameter tubular section 13 is formed into a conical shape whose diameter is gradually enlarged from an intermediate part of the small diameter tubular section 11 to a bottom side. The large diameter tubular section 13 has a great thickness at a large diameter end side, and is provided on an outer peripheral surface with a vehicle body engagement annular recess 14.

The vehicle body engagement annular recess 14 includes a vertical wall 14a that projects toward a large diameter side distal end, and a slant wall 14c that is opposed to the vertical wall 14a through a groove bottom surface 14b. The slant wall 14c is disposed at a distal end of an outer peripheral surface of the large diameter tubular section 13. The groove bottom surface 14b is provided with a lip 14h.

The large diameter tubular section 13 is provided on an outer peripheral surface with a plurality of projecting portions 20 that are separated apart from one another in a peripheral direction and extend from a connecting part between the small and large diameter tubular sections 11 and 13 to a distal end of the slant wall 14c of the vehicle body engagement annular recess 14. Each projecting portion 20 is formed into a thick rib-like configuration that projects from the large diameter tubular section 13 in a stepped shape. In the present embodiment, eight projecting portions 20 extend from small diameter end points P4 to large diameter end points P3 in the axial direction and have the same configurations with the same width.

Figure 3:
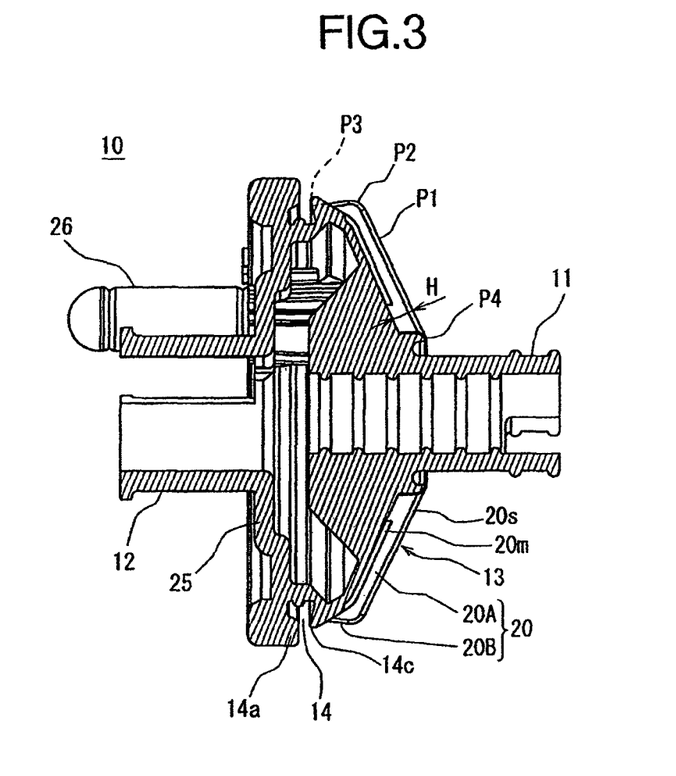
FIG. 3 is a longitudinal section view of the grommet taken along lines B-B in FIG. 1.
Figure 4:
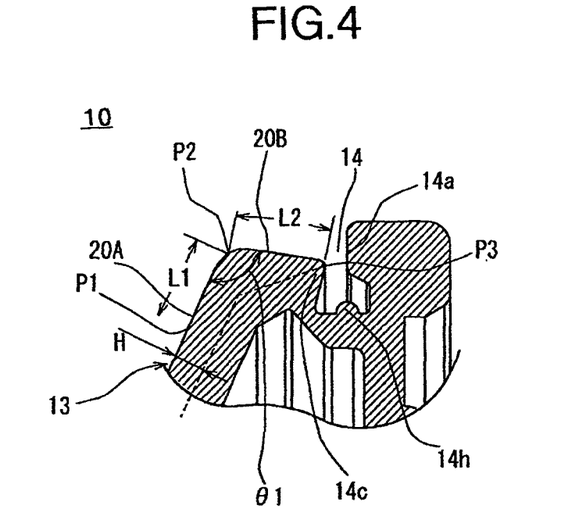
FIG. 4 is a longitudinal section view of a main part of the grommet shown in FIG. 2.

As shown in FIGS. 2 to 4, a height H of each projecting portion 20 that protrudes from the outer peripheral surface 13a of the large diameter tubular section 13 is changed at a bending point P2.

The bending point P2 is disposed at a substantially middle position between a point P1 where each projecting portion 20 initially contacts with the through-hole Hp in the vehicle body panel 30 and a distal end point P3 of the slant wall 14c of the vehicle body engagement annular recess 14. A distance L1 between the initial contact point P1 and the bending point P2 is substantially the same as a distance between the bending point P2 and the slant wall distal end point P3.

Each projecting portion 20 has a constant slant angle parallel to the outer peripheral surface 13a of the large diameter tubular section 13 from the proximal end point P4 at a small diameter side through the initial contact point P1 to the bending point P2 and has a constant projecting height H (3 mm in the present embodiment).

Since the projecting portion 20 extending from the proximal end point P4 to the bending point P2 inclines with respect to a central axis S of the grommet 10 in an enlarging direction from the proximal end point P4, the portion from the point P4 to the point P2 designates an increasing diameter directing slant portion 20A.

A slant direction from the bending point P2 to the distal end point P3 is reversed at the bending point P2. The distal end point P3 is connected to a distal end of the slant wall 14c of the vehicle body engagement annular recess 14. Thus, since the slant angle of the projecting portion 20 is reversed at the bending point P2, the portion from the point P2 to the point P3 designates a reducing diameter directing slant portion 20B. Since the slant angle of the projecting portion 20 is reversed at the bending point P2, the bending point P2 becomes a so-called crest on a hill-like part.

The projecting height H of the reducing diameter directing slant portion 20B gradually decreases in the slant direction opposite from the increasing diameter directing portion 20A. The projecting height H becomes zero at the distal end point P3 and is the same height as a concaved portion 21 between the adjacent projecting portions 20.

Figure 5:
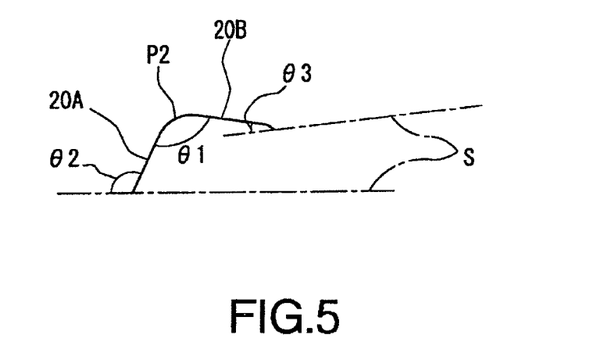
FIG. 5 is an explanatory view illustrating a relationship between angles of a projecting portion.

As shown in FIGS. 4 and 5, an angle θ1 at the bending point P2 between the increasing diameter directing slant portion 20A and the reducing diameter directing slant portion 20B is set in a range of 100 degrees to 120 degrees (105 degrees in the present embodiment).

A slant angle θ2 of the increasing diameter directing slant portion 20A with respect to the central axis S is set to be 115 degrees while a slant angle θ3 of the reducing diameter directing slant portion 20B with respect to the central axis S is set to be 8 degrees.

That is, the reducing diameter directing slant portion 20B is inclined by a range of 3 to 5 degrees with respect to the central axis S of the grommet 10. This angle is substantially in parallel to the central axis S.

Further, a crest angle at the bending point P2 is formed into a formable minimum radius having a edge-like shape so that a crisp feel at the bending point P2 can be enhanced.

Each projecting portion 20 protrudes from the outer peripheral surface 13a of the large diameter tubular section 13 and an outer surface 20a (FIG. 1) of the projecting portion 20 is flat. The projecting portion 20 is provided on each of opposite side edges in a width direction with a slant portion 20s and on each of proximal ends of the opposite side surfaces in the width direction, namely a position along the outer peripheral surface 13a with a grommet axis directing groove 20m.

Since all widths W (FIG. 1) of the projecting portions 20 in the peripheral direction are same in the axial direction of the grommet 10, the projecting portions 20 extend from the small diameter end point P4 to the large diameter side distal end point P3. Adjacent ends of the projecting portions 20 at the small diameter end point P4 are disposed closely, adjacent ends of the portions 20 at the distal end point P3 are disposed widely in a radial arrangement. Thus, triangular concaved portions 21 extend to be widened from the small diameter side to the large diameter side.

Figure 1:
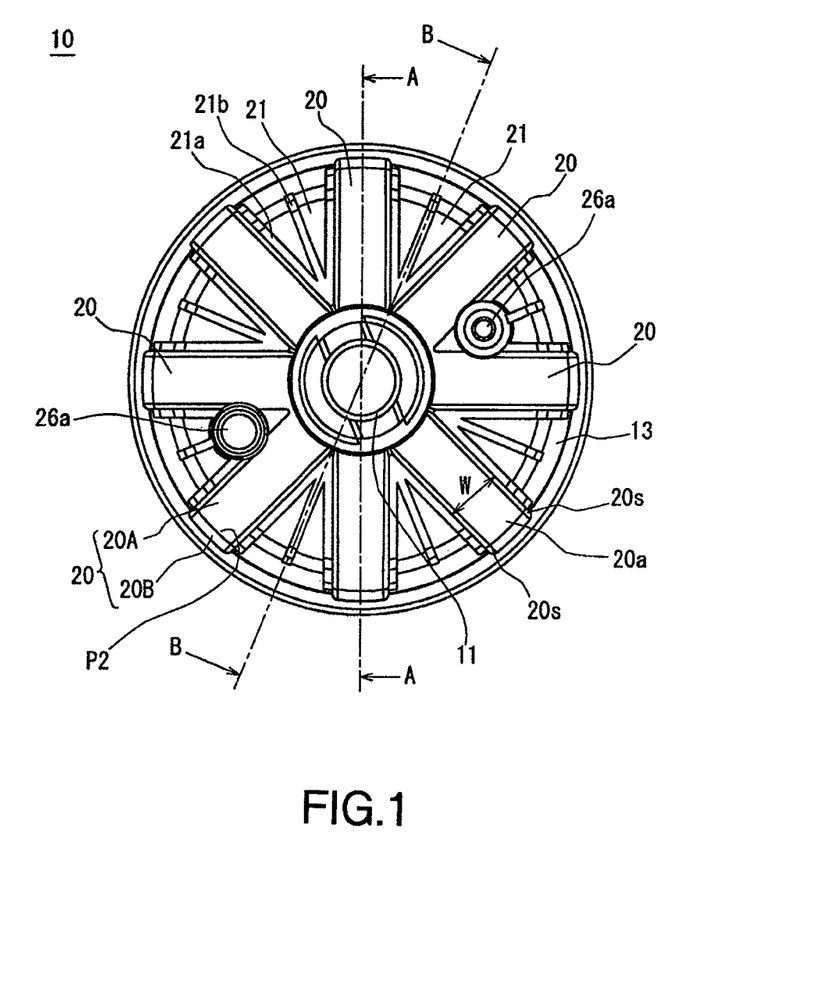
FIG. 1 is a front elevation view of an embodiment of a grommet in accordance with the present invention.

Each triangular concaved portion 21 is provided with grooves 21a continued to the grooves 20m and extending along base parts of opposite sides of the projecting portions 20. A groove 21b is provided between both grooves 21a in the triangular concaved portion 21 so that the triangular concaved portion 21 can be deflected readily.

The first small diameter tubular section 11 is provided on a front end with a projecting portion 11a that protrudes toward an interior of the large diameter tubular section 13 and with support walls 11b that extend from an outer peripheral surface of the projecting portion 11a to an inner peripheral surface of the large diameter tubular section 13.

The large diameter tubular section 13 is provided on a distal end of the large diameter side with a thin end wall 25. The second small diameter tubular section 12 protrudes from a central part of the end wall 25.

The grommet 10 is provided with two cable insertion tubular portions 26 through which two cables pass to be connected to option parts. Each cable insertion tubular portion 26 is provided with an opening 26a that is open in the concave portion 21 on the outer peripheral surface of the large diameter tubular section 13. The cable insertion tubular portion 26 passes the large diameter tubular section 13 and protrudes from the end wall 25. The cable insertion tubular portion 26 is provided on a distal end with a closed portion 26c adapted to be cut out when the cable is threaded.

Next, by referring now to FIGS. 6A to 6D, a process of inserting the grommet 10 into the through-hole Hp in the vehicle body panel 30 will be described below.

Figure 6A:
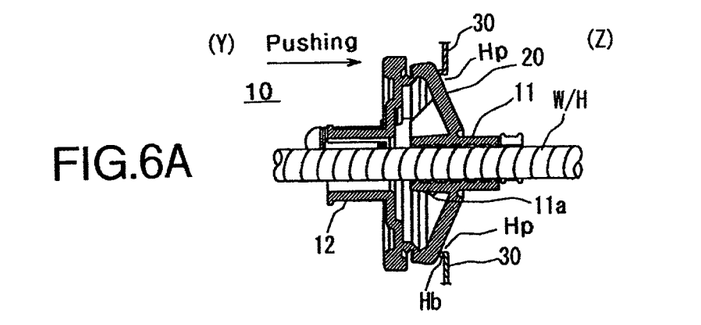
FIGS. 6A to 6D are explanatory views illustrating a process of inserting the grommet into a through-hole.
Figure 6B:
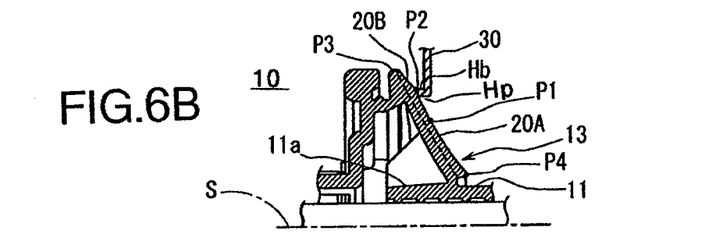

A vehicle body panel 30 is a dash panel that partitions a vehicle body into an exterior side (Y) in an engine room and an interior side (Z) in a passenger room. Firstly, as shown in FIG. 6A, the grommet 10 attached to a wire harness W/H is inserted into the through-hole Hp in the vehicle body panel 30 so that the first small diameter tubular section 11 is inserted into the through-hole Hp from the exterior side (Y). The through-hole Hp is provided on a periphery with a burring Hb that protrudes toward the exterior side (Y).

At this time, if the grommet 10 is disposed in a slant position, a part of the projecting portions 20 contact with an inner peripheral surface of the burring Hb around the through-hole Hp, thereby causing a contact resistance. This can enable a working person to correct an inserting position of the grommet 10. In addition, since many projecting portions 20 are provided on the outer peripheral surface of the thin large diameter tubular section 13, the projecting portions 20 can enhance stiffness of the large diameter tubular section 13. Accordingly, when the grommet 10 is inserted slant into the through-hole Hp, it is possible to surely prevent a part of the large diameter tubular section 13 pressed onto the inner peripheral surface of the burring Hb from being bent toward the burring Hb.

When the large diameter tubular section 13 passes the through-hole Hp and the contact point P1 that has the same size as an inner diameter of the through-hole Hp reaches the burring Hp, the inserting resistance will be caused on account of press contact between the outer surfaces 20a of the projecting portions 20 and the inner peripheral surface of the burring Hb around the through-hole Hp.

When the grommet 10 is further inserted into the through-hole Hp over the contact point P1, the inserting resistance will be increased gradually. Immediately before the bending point P1 passes over the inner peripheral surface of the burring Hb around the through-hole Hp, the grommet 10 is under a state shown in FIG. 6B. That is, since the increasing diameter directing slant portion 20A is deflected inward by the inner peripheral surface of the burring Hb, the reducing diameter directing slant portion 20B that is connected through the bending point P2 to the enlarging diameter directing slant portion 20A is deflected outward. Since the crest of the bending point P2 has the minimum radium similar to a edge-like shape, the grommet 10 is caught by the burring Hb immediately before the bending point P2, thereby surely causing the crisp feel.

Figure 6C:
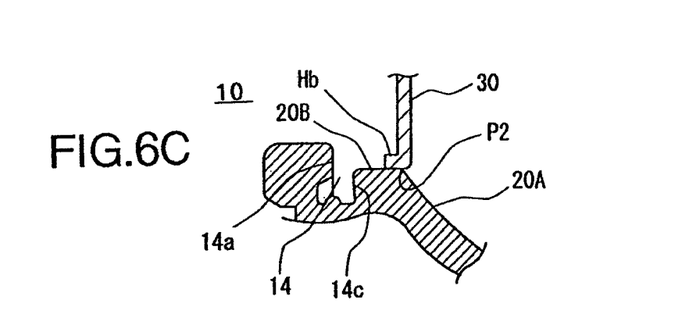

When the crisp feel is caused, the working person pushes the grommet at a stroke so that the grommet 10 is inserted into the through-hole Hp while depressing the bending point P2, as shown in FIG. 6C. Then, the reducing diameter directing slant portion 20B deflected upward is changed to a substantially horizontal position in FIG. 6C in parallel to the central axis S of the grommet 10. That is, since a height of the reducing diameter directing slant portion 20B becomes substantially equal to a height of the slant wall 14c of the vehicle body engagement annular recess 14, the working person can insert the grommet 10 into the through-hole Hp straightly. Since a thickness of the reducing diameter directing slant portion 20B decreases gradually toward its distal end and the concaved portion 21 smoothly decreases its diameter, a great force is not required, thereby inserting the grommet 10 into the through-hole Hp by a small pushing force.

Figure 6D:
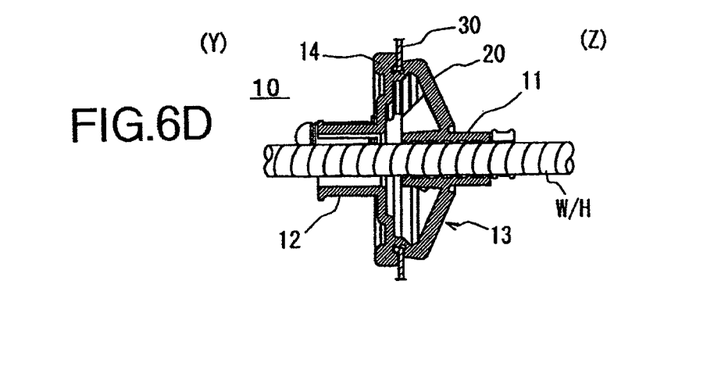

Thus, the outer surfaces of the eight projecting portions 20 are pressed by the inner peripheral surface of the burring Hb around the through-hole Hb, and the projecting end of the slant wall 14c are passed through the inner peripheral surface of the burring Hb while reducing the large diameter tubular section 13. When the slant wall 14c passes the through-hole Hp, as shown in FIG. 6D, the large diameter tubular section 13 and the projecting portions 20 of the grommet 10 return to the original position by their elasticity and the burring Hb around the through-hole Hp falls into the groove bottom surface 14b between the slant wall 14c and the vertical wall 14a. Under this condition, the opposed surfaces of the slant wall 14c and the vertical wall 14a press the vehicle body panel 30 and a lip 14h on a groove bottom surface 14b, and the grommet 10 is engaged with and sealed in the through-hole Hp in the vehicle body panel 30.

As described above, since the grommet 10 of the present invention is provided with the projecting portions 20 whose the slant directions are changed at the bending point P2, the crisp feel is surely caused at the bending point P2, the working person can strongly push the grommet 10 into the through-hole Hp at a stroke when the crisp feel is caused. Accordingly, it is possible to enhance inserting feel.

Further, since the reducing diameter directing slant portion 20B is substantially parallel to the central axis S of the grommet 10 near the projecting end of the slant wall 14c, the reducing diameter directing slant portion 20B serves to guide the slant wall 14c so that the slant wall 14c can pass the through-hole Hp. Accordingly, the large diameter tubular section 13 and the projecting portions can pass smoothly the through-hole Hp without deforming them near the projecting end of the slant wall 14c.

The present invention is not limited to the above embodiment. The number of the projecting portions is not limited to eight and it may be four to ten in accordance with a thickness of each projecting portion. The cable passing tubular portions for the option parts are not always necessary. Further, the present invention can be applied to a through-hole having an ellipse shape and to the grommet in which the large diameter tubular section has an ellipse shape in cross section.

The invention claimed is:

1. A grommet including a small diameter tubular section and a large diameter tubular section contiguous with said small diameter tubular section, both of said tubular sections configured to be attached to a wire harness for a motor vehicle by threading said wire harness through both of said tubular sections, said small diameter tubular section configured to be inserted into a through-hole in a vehicle body panel, said large diameter tubular section being provided on an outer peripheral surface with a vehicle body engagement annular recess, and said recess configured to be engaged with said vehicle body panel;

said large diameter tubular section being provided on the outer peripheral surface with a plurality of projecting portions that extend from a connecting part between both of said tubular sections to a slant wall of a side wall of said vehicle body engagement annular recess in an axial direction of said large diameter tubular section and are spaced from one another in a peripheral direction of said large diameter tubular section; and each of said projecting portions including a contact point that initially contacts with an inner peripheral surface around said through-hole upon inserting said grommet into said through-hole, a bending point above said contact point, a distal end point at a side of said vehicle body engagement annular recess, and a proximal end point at said connecting part, each of said projecting portions including an increasing diameter directing slant portion that extends from said proximal end point through said contact point to said bending point in parallel to the outer peripheral surface of said large diameter tubular section, and a decreasing diameter directing slant portion that extends from said bending point to said distal end point at a side of said vehicle body engagement annular recess and inclines in a reversed slant direction, a distal end of said decreasing diameter directing slant portion being disposed at said distal end point protruding from said slant wall, and said slant wall being disposed between said distal end of said decreasing diameter slant portion and a groove bottom surface of said vehicle body engagement annular recess.

2. A grommet according to claim 1, wherein said bending point is disposed at a position where a distance from said contact point to said bending point is substantially equal to a distance from said bending point to said distal end point.

3. A grommet according to claim 2, wherein when said increasing diameter directing slant portion is pressed at a position immediately before said bending point by the inner peripheral surface around said through-hole, said decreasing diameter directing slant portion is deflected outward, and when said increasing diameter directing slant portion is pressed at said bending point by the inner peripheral surface around said through-hole, said decreasing diameter directing slant portion from said bending point to said distal end point extends substantially in parallel to a central axis of said large diameter tubular section.

4. A grommet according to claim 2, wherein an angle between said increasing diameter directing slant portion and said decreasing diameter directing slant portion at said bending point is in a range from 100 degrees to 120 degrees.

5. A grommet according to claim 4, wherein said grommet comprises rubber or elastomer, a crest angle at said bending point is a minimum radius in a formable range.

6. A grommet according to claim 5, wherein when said increasing diameter directing slant portion is pressed at a position immediately before said bending point by the inner peripheral surface around said through-hole, said decreasing diameter directing slant portion is deflected outward, and when said increasing diameter directing slant portion is pressed at said bending point by the inner peripheral surface around said through-hole, said decreasing diameter directing slant portion from said bending point to said distal end point extends substantially in parallel to a central axis of said large diameter tubular section.

7. A grommet according to claim 4, wherein when said increasing diameter directing slant portion is pressed at a position immediately before said bending point by the inner peripheral surface around said through-hole, said decreasing diameter directing slant portion is deflected outward, and when said increasing diameter directing slant portion is pressed at said bending point by the inner peripheral surface around said through-hole, said decreasing diameter directing slant portion from said bending point to said distal end point extends substantially in parallel to a central axis of said large diameter tubular section.

8. A grommet according to claim 2, wherein said grommet comprises rubber or elastomer, a crest angle at said bending point is a minimum radius in a formable range.

9. A grommet according to claim 8, wherein when said increasing diameter directing slant portion is pressed at a position immediately before said bending point by the inner peripheral surface around said through-hole, said decreasing diameter directing slant portion is deflected outward, and when said increasing diameter directing slant portion is pressed at said bending point by the inner peripheral surface around said through-hole, said decreasing diameter directing slant portion from said bending point to said distal end point extends substantially in parallel to a central axis of said large diameter tubular section.

10. A grommet according to claim 1, wherein an angle between said increasing diameter directing slant portion and said decreasing diameter directing slant portion at said bending point is in a range from 100 degrees to 120 degrees.

11. A grommet according to claim 10, wherein said grommet comprises rubber or elastomer, a crest angle at said bending point is a minimum radius in a formable range.

12. A grommet according to claim 11, wherein when said increasing diameter directing slant portion is pressed at a position immediately before said bending point by the inner peripheral surface around said through-hole, said decreasing diameter directing slant portion is deflected outward, and when said increasing diameter directing slant portion is pressed at said bending point by the inner peripheral surface around said through-hole, said decreasing diameter directing slant portion from said bending point to said distal end point extends substantially in parallel to a central axis of said large diameter tubular section.

13. A grommet according to claim 10, wherein when said increasing diameter directing slant portion is pressed at a position immediately before said bending point by the inner peripheral surface around said through-hole, said decreasing diameter directing slant portion is deflected outward, and when said increasing diameter directing slant portion is pressed at said bending point by the inner peripheral surface around said through-hole, said decreasing diameter directing slant portion from said bending point to said distal end point extends substantially in parallel to a central axis of said large diameter tubular section.

14. A grommet according to claim 1, wherein said grommet comprises rubber or elastomer, a crest angle at said bending point is a minimum radius in a formable range.

15. A grommet according to claim 14, wherein when said increasing diameter directing slant portion is pressed at a position immediately before said bending point by the inner peripheral surface around said through-hole, said decreasing diameter directing slant portion is deflected outward, and when said increasing diameter directing slant portion is pressed at said bending point by the inner peripheral surface around said through-hole, said decreasing diameter directing slant portion from said bending point to said distal end point extends substantially in parallel to a central axis of said large diameter tubular section.

16. The grommet according to claim 1, a projecting height of the decreasing diameter directing slant portion gradually decreases from the increasing diameter directing slant portion and becomes a same height as portions between adjacent projecting portions of the large diameter tubular section at the distal end point.

17. The grommet according to claim 1, each of said projecting portions has a constant slant angle, parallel to an outer peripheral surface of the large diameter tubular section, from the proximal end point to the bending point.

18. The grommet according to claim 1, said slant wall of a side wall of said vehicle body engagement annular recess extending from an end of said decreasing diameter directing slant portion towards the groove bottom surface of said vehicle body engagement annular recess.

* * * * *

UNITED STATES PATENT AND TRADEMARK OFFICE
CERTIFICATE OF CORRECTION

PATENT NO.       : 8,487,188 B2  
APPLICATION NO.  : 12/865170  
DATED            : July 16, 2013  
INVENTOR(S)      : Okuhara et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 403 days.

Signed and Sealed this
Eighth Day of September, 2015

Michelle K. Lee
*Director of the United States Patent and Trademark Office*